United States Patent [19]
Heinrich et al.

[11] Patent Number: 4,871,922
[45] Date of Patent: Oct. 3, 1989

[54] ENCLOSURE FOR ENGINE DRIVEN GENERATOR SET

[75] Inventors: Martin W. Heinrich, Cedar Grove; Donald R. Fischer, Sheboygan, both of Wis.

[73] Assignee: Kohler Co., Kohler, Wis.

[21] Appl. No.: 234,917

[22] Filed: Aug. 22, 1988

[51] Int. Cl.⁴ ............................................. F02B 63/04
[52] U.S. Cl. .................................................... 290/1 B
[58] Field of Search ...................... 290/1 R, 1 A, 1 B; 180/68.1, 68.2; 181/202

[56] References Cited

U.S. PATENT DOCUMENTS

| | | | |
|---|---|---|---|
| 2,198,792 | 4/1940 | Schjolin | 180/68.2 |
| 2,319,002 | 5/1943 | Kramer | 180/68.2 X |
| 2,482,924 | 9/1949 | Melcher | 290/1 A |
| 2,789,234 | 4/1957 | Lambert et al. | 290/1 B |
| 3,791,482 | 2/1974 | Sykora | 181/229 |
| 4,243,893 | 1/1981 | Sten | 290/1 B |
| 4,362,208 | 12/1982 | Hauser | 165/51 |
| 4,540,888 | 9/1985 | Drewry et al. | 290/1 R |
| 4,608,946 | 9/1986 | Tanaka et al. | 290/1 A X |
| 4,677,940 | 7/1987 | Bracht et al. | 123/2 |
| 4,698,975 | 10/1987 | Tsukamoto et al. | 60/721 |
| 4,702,201 | 10/1987 | Odo et al. | 290/1 A X |
| 4,721,070 | 1/1988 | Tanaka et al. | 290/1 B X |
| 4,733,750 | 3/1988 | Poirier et al. | 181/202 |

FOREIGN PATENT DOCUMENTS 1043731  9/1966  United Kingdom .............. 290/1 A

Primary Examiner—William M. Shoop, Jr.
Assistant Examiner—W. E. Duncanson, Jr.
Attorney, Agent, or Firm—Quarles & Brady

[57] ABSTRACT

An enclosure for an engine and a generator which is adapted to be positioned in the front of a motor vehicle and adjacent an inlet for the coolng air of the vehicle engine. A housing encloses both an engine and a generator, and there are separate air inlet openings and air outlets for the engine and the generator. In a preferred manner the air outlet duct for the engine extends to the outside of a motor vehicle and laterally thereof with the air outlet adapted to accommodate an exhaust pipe for a generator engine. Also preferably the air inlet and outlet for the generator are disposed at a 90 degree angle from each other.

14 Claims, 3 Drawing Sheets

ENCLOSURE FOR ENGINE DRIVEN GENERATOR SET

BACKGROUND OF THE INVENTION

The field of the invention is enclosures for engine driven generators and more particularly, engine driven enclosures which can provide efficient cooling to the generator set.

It is common practice in vehicles and particularly recreational vehicles to mount an engine generator set at the back of the RV van. This is shown in U.S. Pat. No. 4,540,888 which is commonly assigned. Locating the motor driven generator in the rear of the vehicle in attempting to supply it with cooling air poses a problem in directing cooling air into the unit. If the housing could be placed in the front of the vehicle, movement of the vehicle could assist in the air being forced directly into the housing without the use of additional blowers or fans. In those instances where the recreational vehicle is driven by an engine placed in the rear of the vehicle there is room in the front of the vehicle for placement of the generator housing. However, locating this power module behind the vehicle engine radiator is less than an ideal place for efficient cooling of the unit.

In U.S. Pat. No. 4,243,893 there is shown a cooling system for an auxiliary electrical generator in a motor vehicle wherein separate air paths are provided for an engine and a generator. This system also shows an exhaust pipe which exits through an air inlet in the housing. However, no consideration is given as to placement of the enclosure in the vehicle.

In contrast to the prior art structures which have been devised to cool engine driven generators in vehicles, the present invention relates to an efficient cooling system for a vehicle engine generator set which overcomes the above enumerated disadvantages.

BRIEF SUMMARY OF THE INVENTION

Briefly, in accordance with the preferred embodiment of the invention, there is provided an enclosure for an engine and a generator wherein the enclosure is adapted to be positioned in the front of a motor vehicle and adjacent an inlet for the cooling air of the vehicle engine. There is a housing which encloses both the engine and the generator and has at least one air inlet opening and one air outlet opening spaced from the air inlet. There is an air outlet duct in fluid communication with the air outlet and adapted to extend to the outside of the motor vehicle. The air outlet duct is constructed and arranged to accommodate an exhaust pipe for the generator engine.

In another embodiment, the housing encloses both the engine and a generator with a first air inlet opening for the generator motor in the front of the housing. There is a first air outlet in the side of the housing and a second air inlet opening for the generator in the back portion of the housing. There is also a second air outlet for the generator. The second air outlet is spaced from the second air inlet in a manner so that air entering and exiting the housing is required to take at least one 90° angle turn. In addition, there are baffle means positioned in the housing to separate incoming air from the exiting warmer air of the engine.

In yet another embodiment, there are baffle means positioned adjacent the finned cylinder walls of the engine so as to direct the cooling air across the cylinder walls at the top and the bottom. The baffles are part of a shroud which acts to direct the cooling air to the first air outlet at the side of the housing.

Accordingly, it is an object of the present invention to provide an enclosure for an engine generator which is especially well suited for use in a recreational vehicle. The enclosure is especially adapted to be placed at the front of the vehicle so that a maximum volume of air can be introduced into it.

It is another object of the present invention to provide a cooling enclosure for an engine generator wherein the exiting air from the enclosure is positioned in conjunction with the exhaust pipe and muffler of the motor so as to maximize cooling.

It is yet another object of the present invention to provide a common cooling enclosure for a motor driven generator wherein the motor and the generator have separate cooling paths.

Yet another object of the present invention is to provide a cooling and acoustical engine generator enclosure wherein an outlet duct for the unit can provide an eductor effect when the vehicle is in motion in combination with the air entering the front of the vehicle.

Other objects and advantages of the present invention will become readily apparent upon reading of the foregoing specification and claims.

BRIEF SUMMARY OF THE DRAWINGS

The features of the invention believed to be novel are set forth with particularity in the appended claims. The invention itself, however, both as to organization and method of operation, together with further obvious advantages thereof, may best be understood by reference to the following description taken in conjunction with the accompanying drawings in which:

DETAILED DESCRIPTION OF THE PREFERRED EMBODIMENTS

Figure 1:
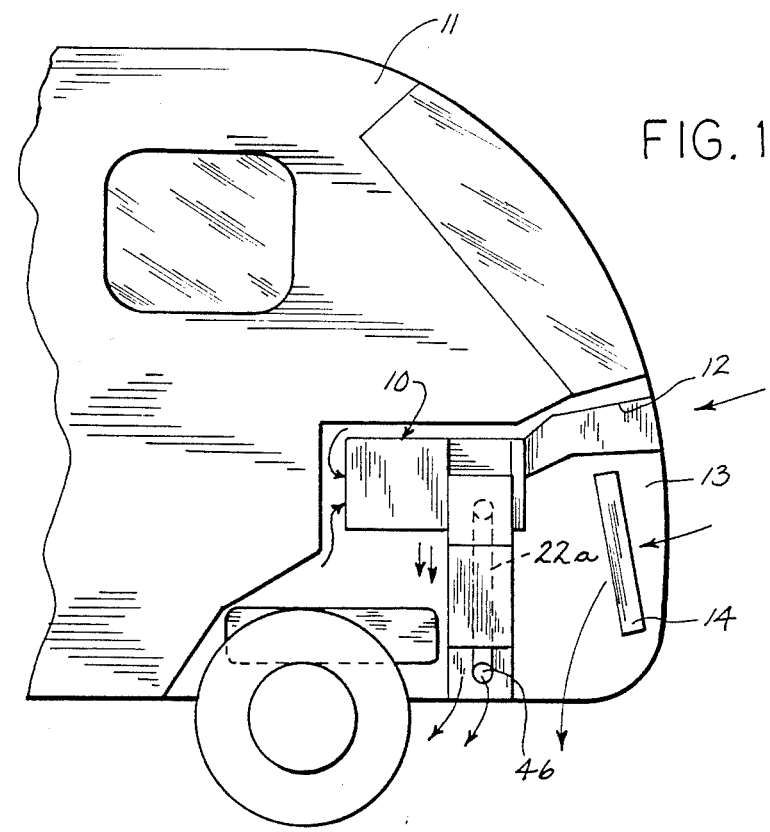
FIG. 1 is a partial side view of recreational vehicle showing the placement of the enclosure of this invention.

FIG. 1 illustrates a recreational vehicle 11 which is of the rear engine driven type. The enclosure generally 10 is placed in the front of the vehicle and is supported therein by attaching it to the framework of the vehicle (not shown). It can be mounted below or above the floor and if floor mounting is undesirable or impractical, the generator set can be cradled below the floor in a slide tray type installation. An air inlet 12 is disposed through the front of the vehicle and communicates with the enclosure 10. Another but separate air duct 13 is also shown at the front of the vehicle, the purpose of which is to supply cooling air to the radiator 14 for purposes of cooling the rear vehicle engine for driving the vehicle.

Figure 3:
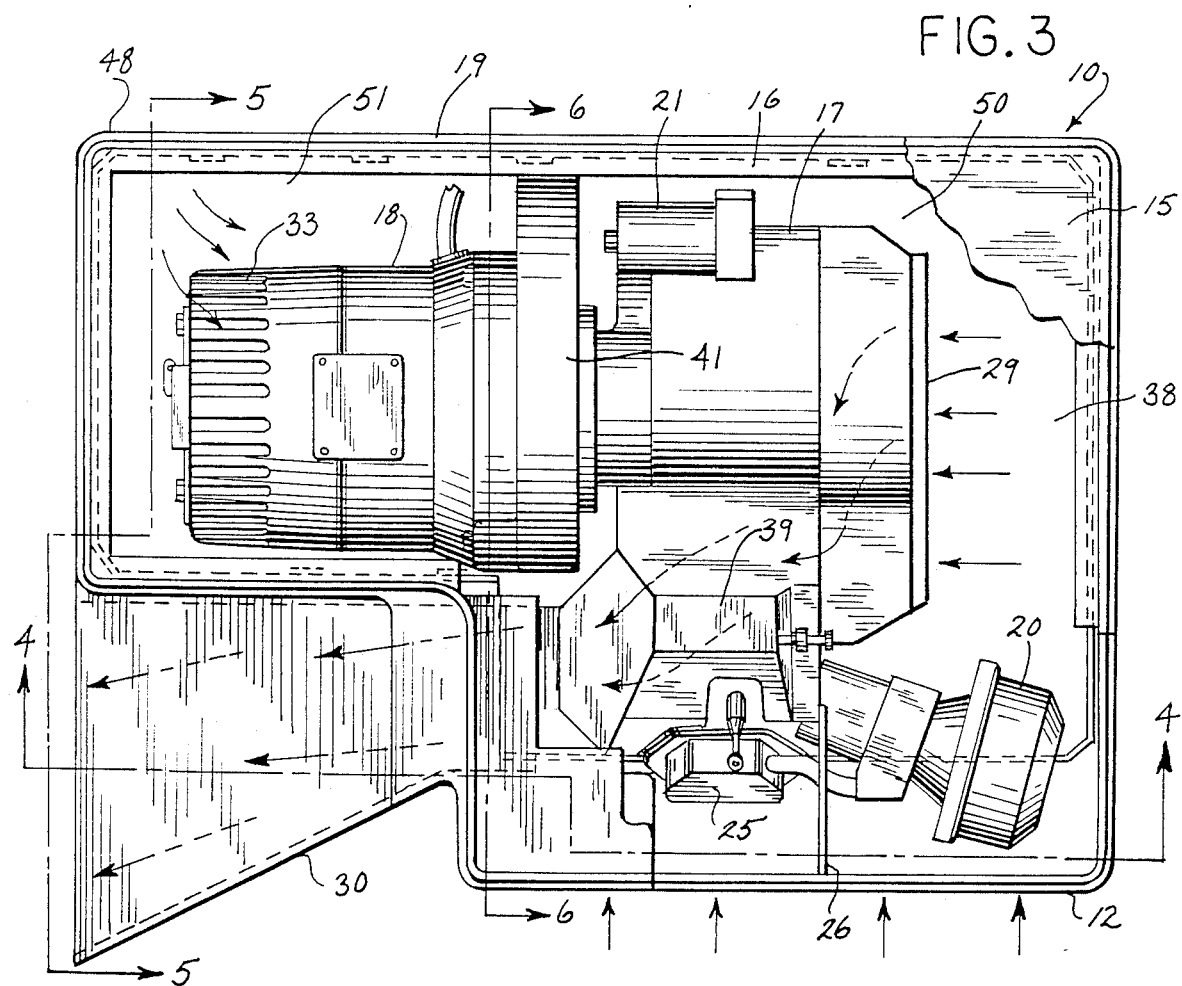
FIG. 3 is top plan view with the cover removed showing the enclosure of this invention and indicating the air flow path by means of the directional arrows.
Figure 4:
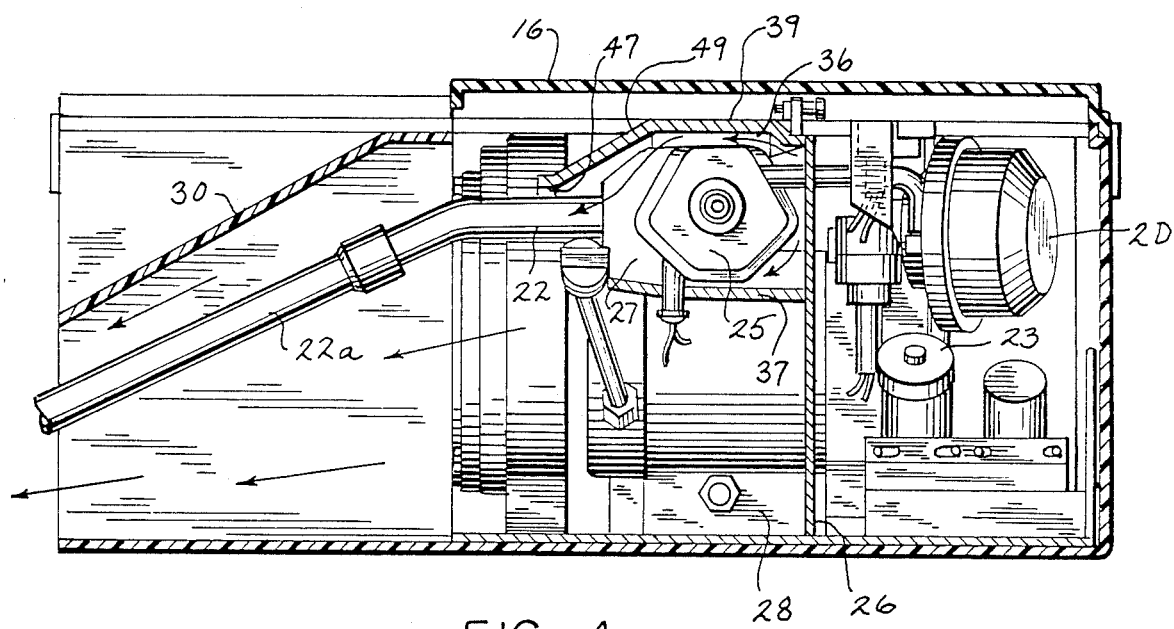
FIG. 4 is a view in vertical section taken along line 4—4 of FIG. 3 with the engine shroud or baffle shown in section.

As best seen in FIG. 3, the enclosure 10 includes a housing 16 which would be positioned such that that portion at the bottom of the sheet of the drawing would face the front of the vehicle as shown in FIG. 1. The housing 16 includes a bottom portion 19 and a top portion 15. Inside the housing 16 there is the engine 17 for driving the generator 18 in the usual manner. At the front of the housing there is the air inlet 20 for supplying air to the engine 17. The engine 17 has the usual engine driven cooling fan inside the fan housing 29. The engine is mounted inside the housing by the usual mounting block 28 as best seen in FIG. 4. A starter 21 is provided with the motor 17 and it also has the usual air inlet 20 and an electric fuel pump 23 (See FIGS. 4 and 5). Extending transversely to the air inlet 12 is an air outlet duct 30.

It should also be noted in FIG. 3 that a baffle 26 is positioned in the inlet 12. This baffle 26 is for the purpose of separating cooling air entering into inlet 12 from mixing with warm air which would be generated by the engine head 25 which is placed in proximity to the inlet 12.

Figure 2:
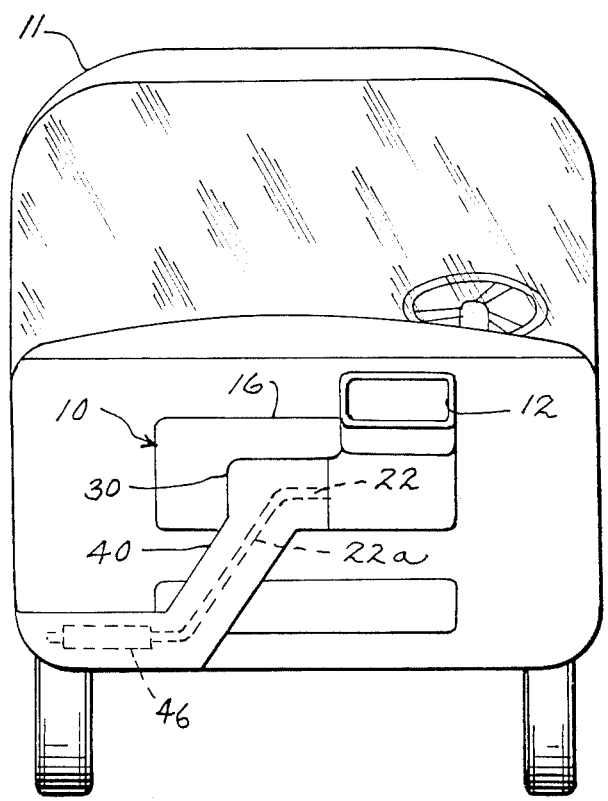
FIG. 2 is a view in front elevation showing the vehicle in FIG. 1 but taken 90° therefrom.

As best seen in FIGS. 2 and 4, an exhaust pipe 22 with an extension 22a is positioned inside the outlet duct 30. The outlet duct 30 is connected to an additional outlet duct 40 through which extends exhaust pipe 22a and a muffler 46 with duct 40 opening to the side of the vehicle 11.

As also seen in FIG. 2, another important aspect is the positioning of the air inlet 12 at the front of the van 11 in combination with the air outlets 30 and 40 which are positioned laterally thereto. This creates an eductor effect as the air is "pushed" into the inlet 12 by the movement of the van and "pulled" from the side. Air inlet 12 is preferably fabricated as a separate component and is secured to housing 16.

Figure 5:
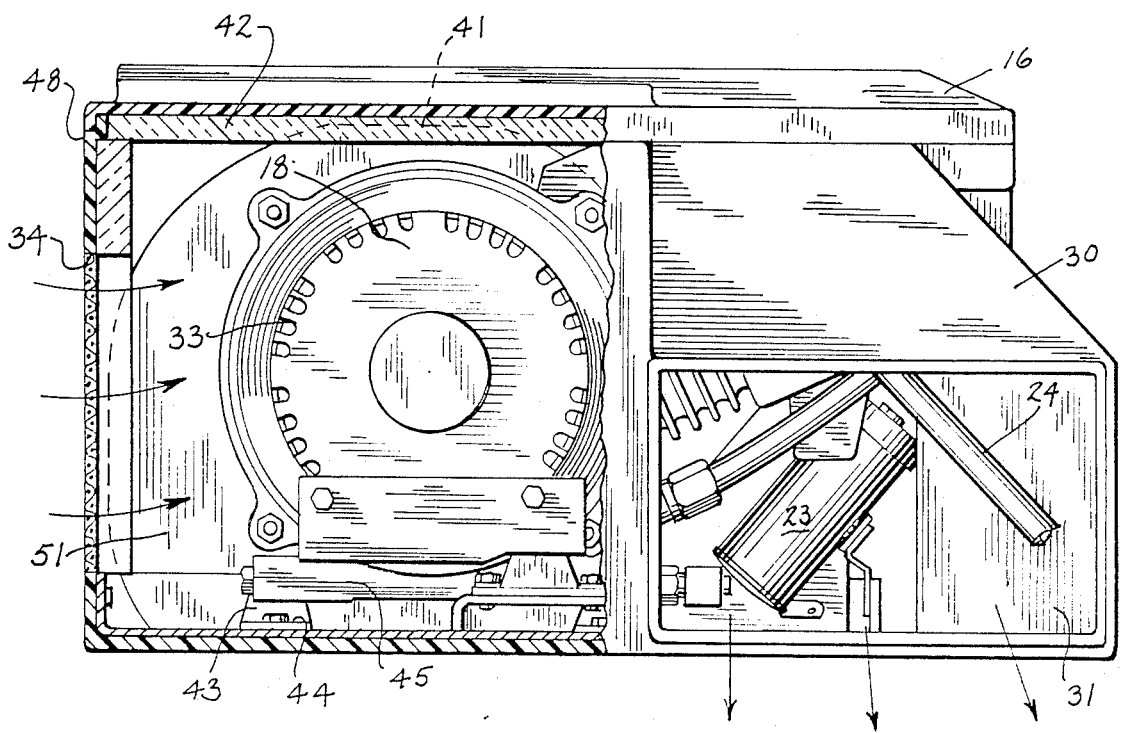
FIG. 5 is a view in vertical section taken along line 5—5 of FIG. 3.

FIG. 5 best represents the air inlet 34 which is placed through the back wall 48 of the housing 16. It is positioned adjacent but laterally of the fan housing 33 of the generator 18. It should be appreciated that the housing 16 is divided into compartments 50 and 51 (See FIG. 3) so that the portion which houses the engine 17 is separated from that portion which houses the generator 18. This is accomplished by the large diameter portion 41 of the generator housing contacting a resilient and acoustical liner portion 42 which has a complementary contacting surface. The generator 18 is mounted in the housing 16 such as by the usual bracket assembly shown at 43 and includes the usual foot members 44 and cross members 45.

OPERATION

A better understanding of the advantages of the enclosure 10 will be had by a description of its operation. An important aspect of the enclosure 10 is the fact that the common housing 10 is divided so as to provide the previously indicated separate compartments 50 and 51 for cooling air to cool the engine 17 and the generator 18, respectively. For example, referring to the engine 17, and as best seen in FIG. 3, the cooling air enters the inlet 12 and is forced therein by the motion of the vehicle as air is forced into the inlet 12 at the front. A motor driven fan (not shown) is located in the fan housing 29. As it is rotated it pulls the air in from the housing portion 38 and directs it in a lateral manner and then over the finned wall 27 of the engine. (See FIGS. 4 and 6). This is indicated by the directional arrows in FIGS. 3 and 4. Direction of the cooling air over the finned wall is assisted by the upper baffle or shroud 39 having the side wall 36 and the lower 37 baffle which are best seen in FIG. 4. These baffles are placed in a manner so as to force the air into more direct contact with the fins 27. The upper baffle 39 has an inclined portion 49 so as to direct the air in a somewhat downward motion, out the outlet 47 and into the outlet duct 30.

Figure 6:
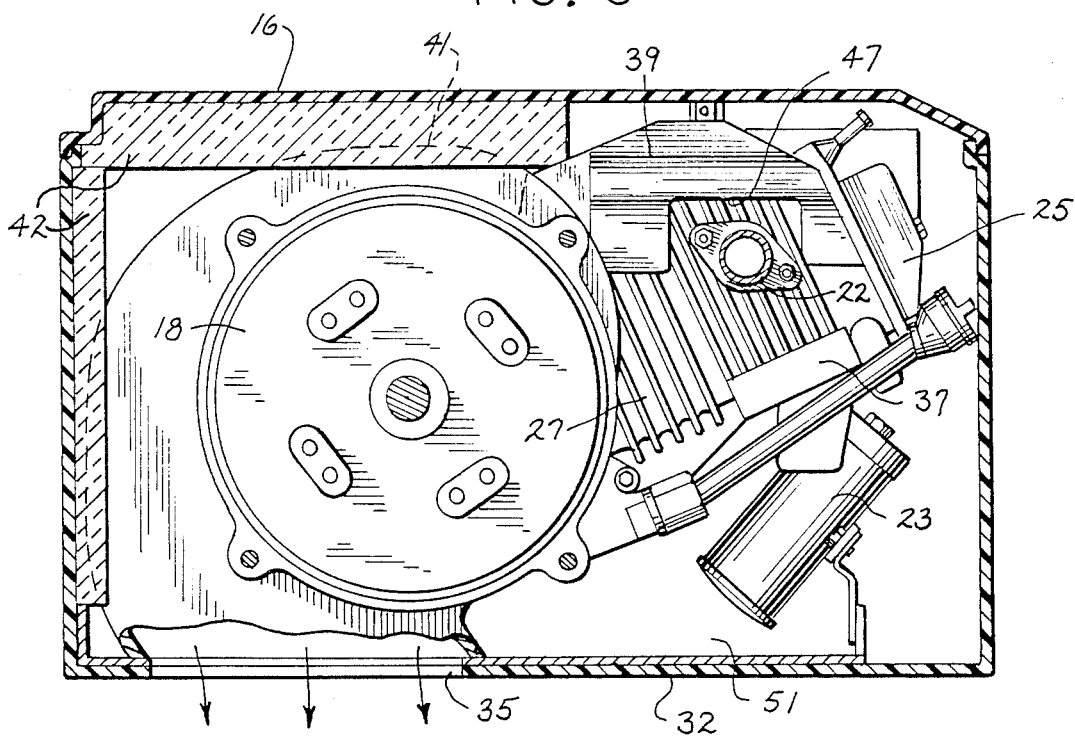
FIG. 6 is a view in vertical section taken along line 6—6 of FIG. 2.

Independently thereof, the cooling for the generator 18 has its own separate pathway in housing portion 51. As indicated by the directional arrows in FIG. 5, air enters near the rear corner of the housing wall 48. It is drawn therein by a fan in the fan housing 33 which pulls the air into the housing portion 51 and moves it in the direction of outlet 35 which is provided in the floor 32. This is best seen in FIG. 6 where it will be noted that in conjunction with FIG. 5 the cooling air is required to make at least one 90 degree angle. This is effected in part by the fan housing 33 being aligned with air outlet 35.

The generator 18 typically takes the form of a rotating field 5.0 kw generator manufactured by Kohler Co., Kohler, Wisconsin. It will also be understood that the generator in this instance will have the usual electrical connectors which will carry the generator current to the usual junction box or tray to provide an outlet of the current. It should be understood that other types of generators of either nonregulated or regulated design could be employed. The enclosure 10 has been illustrated for use in conjunction with a recreational vehicle. If desired, it can be as easily adapted to any type of motor vehicle which would require the supplemental generation of electrical current. For example, it could be utilized in conjunction with travel trailers. It could also have other non-vehicle applications. In those instances of non-vehicular application the added feature of having the air forced in at the front of the motor housing and exiting at the side with the eductor effect would not be accomplished.

The baffle 26 has been employed in order to separate incoming cooling air from any warm air produced by the engine 17. This element is of more importance when the vehicle is not moving. However it could be eliminated without seriously affecting the efficiency of the cooling enclosure. Further, while the exhaust pipes 22 and 22a and the muffler 46 for the motor have been shown inside the outlet air duct 40, this is not necessary and many of the other features of this invention could be accomplished by placing them outside duct 40.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. An enclosure for an engine and a generator, the enclosure adapted to be positioned in the front of a motor vehicle and adjacent an inlet for the cooling air of the vehicle engine, the enclosure comprising:
   a housing enclosing both an engine and a generator;
   at least one air inlet opening and an air outlet opening spaced from said air inlet;
   an air outlet duct in fluid communication with the air outlet and adapted to extend to the outside of a motor vehicle, the air outlet constructed and arranged to accommodate an exhaust pipe for a generator engine;
   whereby the same duct accommodates both air exiting from the enclosure and the exhaust pipe so that the exiting air assists in cooling the exhaust pipe.

2. The enclosure as defined in claim 1 wherein the air outlet duct is positioned transversely to the air inlet opening.

3. The enclosure as defined in claim 1 wherein a muffler is connected to the exhaust pipe and both the muffler and exhaust pipe are accommodated in the air outlet duct.

4. The enclosure as defined in claim 1 further including a separate air inlet opening and outlet extending through the housing for the generator.

5. An enclosure for an engine and a generator, the enclosure adapted to be positioned in the front of a motor vehicle adjacent an inlet for the cooling air of the vehicle engine, the enclosure comprising:
   a housing enclosing both an engine and a generator;
   a first air inlet opening for the generator engine in a front of the housing;
   a first air outlet in a side of the housing;
   a second air inlet opening for a generator in a back portion of the housing; and
   a second air outlet for the generator, the second air outlet spaced from the second air inlet.

6. The enclosure as defined in claim 5 further including an air outlet duct in fluid communication with the air outlet and adapted to extend to the outside of a motor vehicle.

7. The enclosure as defined in claim 6 wherein the air outlet duct is constructed and arranged to accommodate an exhaust pipe for the generator engine.

8. The enclosure as defined in claim 5 wherein the first inlet opening is defined by a separate component from the housing.

9. The enclosure as defined in claim 8 wherein the housing for the engine and the generator is provided by a bottom portion and a removable top.

10. The enclosure as defined in claim 5 wherein the second air inlet is disposed in a back wall of the housing and the second air outlet is disposed in a bottom floor.

11. The enclosure as defined in claim 5 further including baffle means positioned in the housing to separate incoming inlet air and warmer air generated by the generator engine.

12. The enclosure as defined in claim 10 wherein a generator cooling fan is aligned with the air outlet.

13. The enclosure as defined in claim 5 including a baffle arrangement which directs cooling air to a cooling fan of the generator engine and subsequently over a finned cylinder head of the generator engine.

14. The enclosure as defined in claim 5 wherein the second air outlet is spaced from the second air inlet in a manner so that air entering and exiting the housing is required to make at least one 90 degree angle.

* * * * *